United States Patent
Allaire et al.

(10) Patent No.: US 6,327,875 B1
(45) Date of Patent: Dec. 11, 2001

(54) CONTROL OF MEDIAN CRACK DEPTH IN LASER SCORING

(75) Inventors: Roger A. Allaire, Big Flats; James W. Brown, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/264,938

(22) Filed: Mar. 9, 1999

(51) Int. Cl.[7] .................... C03B 21/00; B23K 26/02
(52) U.S. Cl. .................... 65/103; 65/105; 65/112; 219/121.67; 219/121.68; 219/121.69; 219/121.78; 219/121.79
(58) Field of Search .................... 65/105, 112, 103; 219/121.67, 121.68, 121.69, 121.78, 121.79

(56) References Cited

U.S. PATENT DOCUMENTS

| | | | |
|---|---|---|---|
| 3,695,498 | * 10/1972 | Dear | 65/112 |
| 3,790,362 | * 2/1974 | Dahlberg et al. | 65/112 |
| 5,053,171 | * 10/1991 | Portney | 219/121.67 |
| 5,132,505 | * 7/1992 | Zooneveld | 219/121.6 |
| 5,776,220 | 7/1998 | Allaire et al. | |

FOREIGN PATENT DOCUMENTS

93/20015   10/1993   (WO).

OTHER PUBLICATIONS

"Laser Cutting of Thin Glass in Production Technology" Hermanns, Christoph Dr. –lng, Schott Spezialglas, Div. Advanced Processing, pp. 33–36.
"Advanced Glass Separation (Laser Cutting)" Hoekstra, Brian, Accudyne Corp., Palm Bay, FL, pp. 1–6.

* cited by examiner

Primary Examiner—James Derrington
(74) Attorney, Agent, or Firm—Maurice M. Klee

(57) ABSTRACT

A glass sheet is separated by propagating a crack in the glass sheet by moving a laser beam across the surface of the glass sheet along a desired line of separation and then streaming coolant at the glass sheet at a predetermined distance behind the laser beam. By altering the profile of a laser beam used to score glass, and by changing the distance between the spot where the laser beam impinges on the glass and the spot struck by the stream of coolant, the penetration depth of the resultant median crack can be controlled.

18 Claims, 3 Drawing Sheets

CONTROL OF MEDIAN CRACK DEPTH IN LASER SCORING

FIELD OF THE INVENTION

The present invention relates to a method for separating glass sheets and other brittle materials by first scoring them with a laser beam. More particularly, the present invention relates to a method for altering the laser beam profile for the purpose of controlling the distribution of thermal stress in the glass and allowing control of the penetration depth of the resultant median crack.

BACKGROUND OF THE INVENTION

Lasers are commonly used in processes for separating glass plates. For example, U.S. Pat. No. 5,776,220 describes the use of a laser to propagate a blind crack along the surface of a glass sheet. To form the crack, the glass surface is subjected to a process of laser heating followed by rapid cooling. A crack made to score the glass in a glass sheet separation process is typically referred to as a median or vent crack. Because the crack is used to score the glass sheet, it typically extends only partway through the depth of the glass sheet. In this fashion, a glass sheet can be simply and cleanly separated into two smaller sheets by separation along the line of the median crack.

A median crack can be formed by making a small nick or scribe in one surface of the glass sheet. A laser beam is made to impinge on the glass sheet, beginning at the nick. The beam is then moved relative to the glass, generally at a speed between 200 and 700 millimeters per second. The laser beam is made to travel across the glass to trace the path of the scoreline. As the laser beam heats the surface of the glass, a stream of fluid coolant strikes a point just behind the laser beam, relative to the beam's motion across the glass surface. This process of heating followed by rapid cooling creates stresses in the glass sheet, which form a crack that extends along the line of motion of the laser and coolant.

When the scoring process is done rapidly, the thermal energy that forms the median crack is stored in a relatively thin region at the surface of the glass. By way of example, using a $CO_2$ laser operating in D-Mode and running at a speed of 500 mm per second, most of the heat is contained within a region of less than 500 micrometers below the glass surface. This attribute of laser scoring permits the formation of cracks which only extend partway through the glass.

The "shape" of the electromagnetic field within the laser resonator is dependent upon the mirror curvature, spacing and bore diameter of the discharge tube and the energy's wavelength. The "shape" of the beam formed by the laser is generally classified according to the number of nulls that appear across the beam cross-section in two directions. For most purposes, a beam without nulls having a Gaussian power distribution is preferred. However, for glass separation processes, a non-Gaussian mode with one or more nulls can be used to deliver the laser energy more uniformly to the glass surface, resulting in higher effective laser scoring speeds.

A laser operating in D-mode is described in U.S. Pat. No. 5,776,220, which is incorporated by reference in its entirety. FIG. 2 illustrates a cross section of a D-mode laser beam's power distribution, in accordance with this invention. Such non-Gaussian beams, which have at least a pair of intensity peaks located outside a center region of lower power distribution, are preferred in the present invention.

As shown by Kondratenko (PCT WO 93/20015), the footprint shape for the laser beam as it impinges on the glass sheet may be elliptical. The minor and major axes of this elliptical footprint will typically satisfy the following relationship:

$a = 0.2$ to $2.0$ h, and $b = 1.0$ to $10.0$ h, where a is the length of the minor axis and b is the length of the major axis; and h is the thickness of the glass sheet which is being laser scored. According to Kondratenko, when b is greater than 10.0 h, problems in the accuracy of the cutting process arise. Thus, for a glass substrate having a thickness of 0.7 mm (a common thickness for liquid crystal display substrates), Kondratenko teaches that the major axis of the beam spot should not exceed 7 mm in length.

To form an elliptical beam, the laser beam profile generated by the D-Mode is typically transformed with two cylindrical lenses to form a beam with an elliptical footprint. The elliptical beam is used to directly irradiate the glass surface. Using this technique, the depth of the median crack typically ranges from 115 to 118 micrometers with a 280 Watt beam or from 120 to 125 micrometers with a 330 Watt beam.

These laser-scoring techniques provide separation edges of a good quality, by forming a particle-free median crack. The reliability of the procedures and the resulting quality make laser scoring useful in the manufacture of liquid crystal and other flat panel display substrates, where the quality of edge breaks is desirably very high. Additionally almost any application which requires reforming sheet glass, such as the manufacture of auto windows, cosmetic mirrors, or residential windows can advantageously use laser scoring.

However, in some applications where handling of the glass parts is required, after the scoring has been made, but before the separation process, the handling of the scored glass may cause the parts to separate prematurely. One method of preventing this problem is to form shallow median cracks that are less susceptible to unintended separation. However, previously disclosed laser scoring methods do not permit such fine control of the median crack's depth, nor produce a nearly uniform score depth regardless of any change to the power of the laser beam, or the position of the cooling water stream.

Therefore, a need exists for a method of controlling the penetration depth of the median crack produced by a laser scoring technique.

SUMMARY OF THE INVENTION

It is, therefore, a principle object of this invention to provide a method and apparatus for controlling the penetration depth of the median crack produced on a glass sheet by laser scoring techniques.

According to the method, a glass sheet is spot heated with a laser beam that moves along the surface of the glass sheet to form a median crack. The laser beam is transmitted through one or more lenses to form an elliptical beam. Opaque shields are then used to block the elliptical beam at one or both ends of the major axis of the elliptical beam to form a truncated elliptical beam which is moved along a glass sheet to heat the surface of the glass. A stream of coolant is directed from a cooling nozzle to a spot on the heated glass. The cooling distance between the cooling spot and the moving truncated elliptical beam is controlled. By making changes in the cooling distance, the penetration depth of the median crack is controlled, solving the existing need for this kind of control in laser scoring techniques and glass separation systems.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
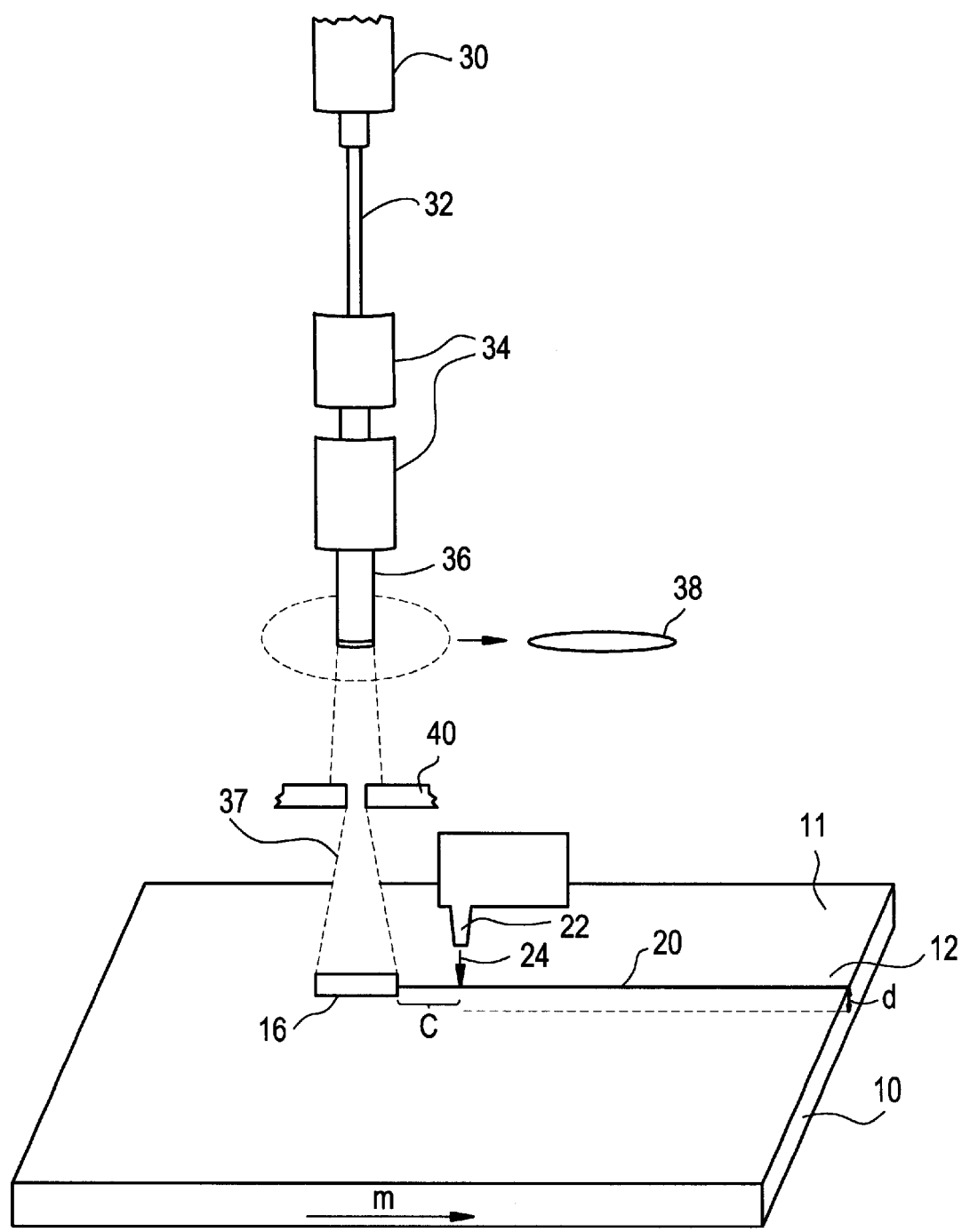
FIG. 1 illustrates a glass sheet laser scoring process in accordance with the present invention.
Figure 2:
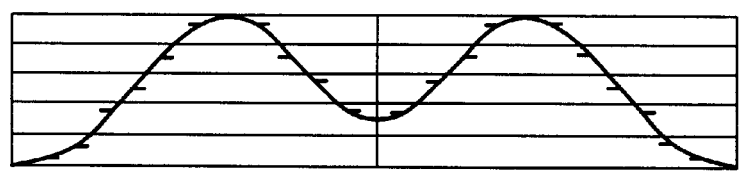
FIG. 2 illustrates the power distribution of a standard D-Mode laser beam.

The present invention relates to a system for breaking glass sheets along a desired line of separation using a laser separation technique. As illustrated in FIG. 1, in the glass breaking system of the present invention, glass sheet 10 has an upper major surface 11. Glass sheet 10 is first nicked or scored along one edge of the glass sheet 10 to form a crack initiation point 12 at one edge of the glass sheet 10. This crack initiation point 12 is then used to form crack 20, by movement of laser beam 16 across glass sheet 10 in the path of the desired line of separation. The laser beam spot 16 is formed by using a laser 30, such as a $CO_2$ laser, to form a first beam 32. A $CO_2$ laser operated in "D" mode will form a beam with a power distribution graph as depicted in FIG. 2. This first beam 32 may then be transformed by one or more lenses 34, such as a pair of cylindrical lenses, to form a second beam 36, having an elliptical footprint 38.

The second beam 36 is then truncated by one or more opaque shields 40 to form the third beam 16. Any material that would absorb and dissipate the laser beam energy could be used to form the opaque shields 40. Carbon shields exhibit a high thermal conductivity and are effective in this regard, although the low oxidation temperature may limit the life of a carbon shield in a production environment. Other alternatives for forming the opaque shields 40 include almost any high temperature ceramic material. The opaque shields 40 should be physically large enough to dissipate the resultant heat without affecting other equipment. A typical shield might be 4 inches square and one-quarter inch thick. The third beam 37 has a truncated elliptical footprint and is used to heat the glass sheet in a localized area along the desired line of separation.

The spot-heated glass is preconditioned with a temperature gradient and profile that is dependent on beam shape, energy and time of exposure. Next, the glass 10 is quenched with a fluid coolant 24, preferably water, applied through a jet 22. When performed within the correct thermal balance (taking into account beam profile, beam energy, process speed, water volume and the distance between the water nozzle behind the beam labelled as c in the Figure), this rapid cooling of the glass surface generates a tensile stress sufficient to generate a median crack 20 from the preexisting starter defect 12 and propagate it across the glass surface at the process speeds.

Figure 3A:
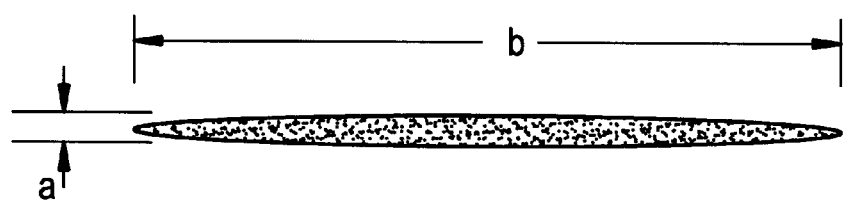
FIGS. 3a, b and c illustrate laser beam footprints in accordance with the invention.
Figure 3B:
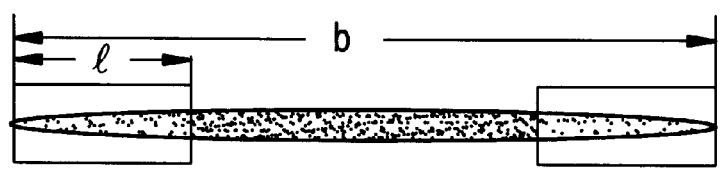
Figure 3C:
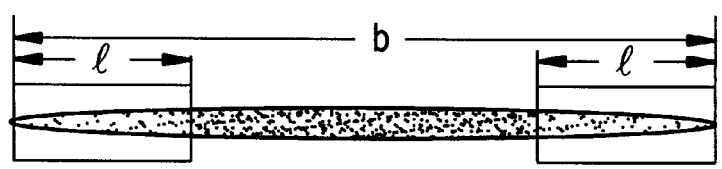

As illustrated in FIG. 3a, the second beam produces a footprint in the shape of an ellipse with a minor axis of length a and a major axis of length b. In accordance with the invention, the elliptical beam of 3a can be truncated at a distance I from one end of the major axis as shown in FIG. 3b or at both ends as shown in FIG. 3c. The elliptical beam 36, prior to truncation, could effectively have a major axis b greater than 20, more preferably greater than 30, and most preferably 40–120 mm or greater. The shields 40 may preferably be set to block between twenty and forty percent of the second beam 36 as measured along the major axis. The truncated axis of the laser beam spot 16 is aligned with the direction of travel m of the desired line of separation across the glass sheet 10.

For thin sheets of glass (1.1 mm or thinner), we have found that the optimum length of the major axis of the laser beam spot is related to the desired speed of travel in that major axis b should preferably be at least about 10 percent of the desired laser scoring speed per second. Thus, for a desired laser scoring speed of 500 mm on 0.7 mm thick glass, the major axis of the laser should preferably be at least about 50 mm long.

The median crack 20 extends only part way, at a depth d, below the surface 11 of glass sheet 10 so that the median crack 20 acts as a scoreline. The depth, shape and direction of the crack are determined by the distribution of the thermoelastic stresses, which in turn are dependent primarily on the following several factors: the power density, dimensions and shape of the beam spot; the rate of relative displacement of the beam spot across the substrate material; the thermophysical properties, quality and conditions of supply of the coolant to the heated zone; and the thermophysical and mechanical properties of the material to be cracked, its thickness, and the state of its surface.

In order to control the depth of the median crack, in accordance with the invention, the truncated elliptical beam 16 is used to heat the glass 10. As a result of the specific qualities of beams having these particular footprints, the depth of the median crack d changes as the cooling stream's strike point is moved relative to the laser beam. FIG. 1 depicts the cooling distance c between the trailing edge of the laser beam spot 16 and the spot where the fluid coolant 24 strikes the glass 10. Changing the cooling distance c by cooling the glass 10 at a point closer to the point being irradiated by the laser beam results in a median crack shallower than the median crack resulting from using a cooling spot chosen so that the cooling distance c is larger.

Figure 4:
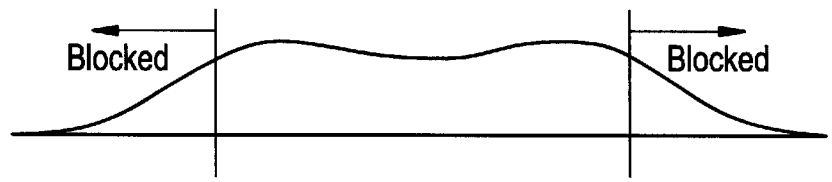
FIG. 4 illustrates the power of a truncated elliptical beam as distributed to glass in accordance with the invention.

By way of example, an elliptical beam is generated by a laser 30 and cylindrical lenses 34. The beam has a minor axis of 1.5 mm and a major axis of 90 mm. In accordance with the invention, opaque shields 40 are placed between the lenses 34 and the glass 10, so that 18 mm regions at the limits of the major axis are blocked as the truncated elliptical laser beam spot 16 impinges on the glass. Because a portion of the laser beam's power, as shown in FIG. 4, is caught by the opaque shields, generating cutting energy in the glass surface 10 equivalent to the energy generated by an unblocked beam requires operating the laser 30 at a higher power setting.

Figure 5:
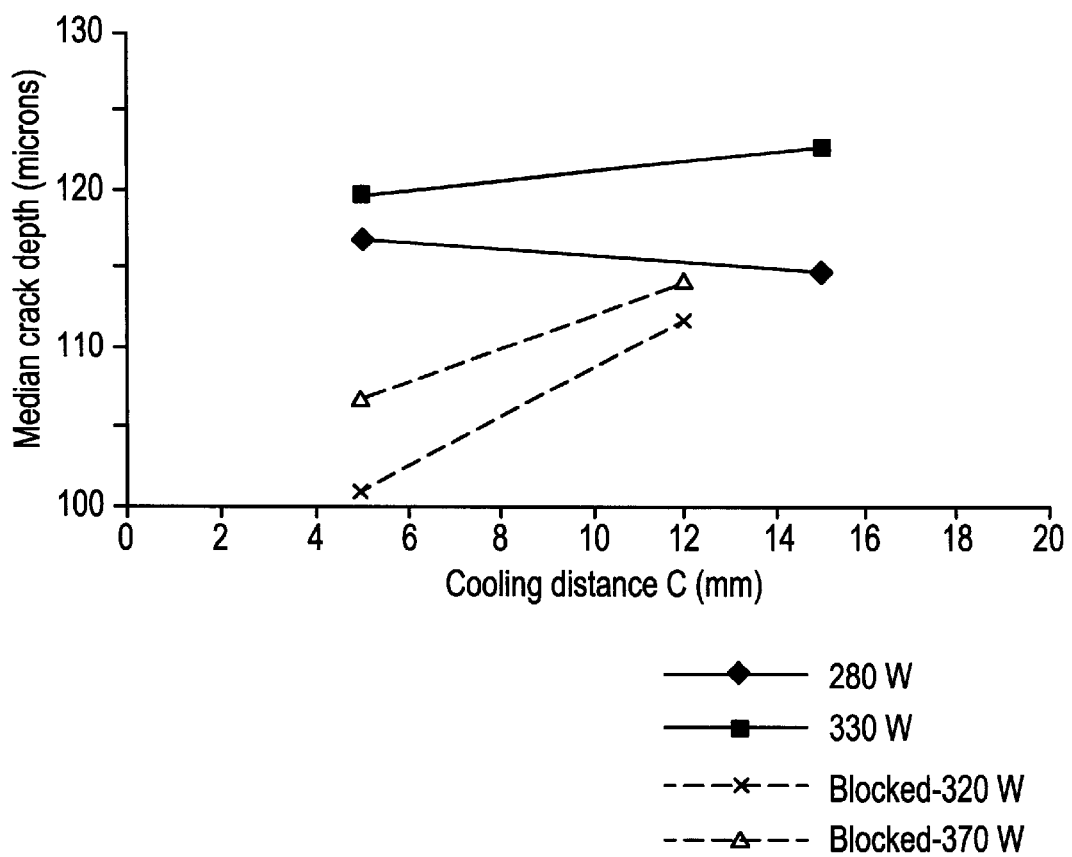
FIG. 5 illustrates the depth of median cracks formed in a glass substrate in accordance with the invention.

As shown by the graph in FIG. 5, using the blocked beam to heat the glass, the depth of the resulting median crack varies significantly as the cooling distance is changed. For example, with a 320 Watt blocked beam, when the nozzle is located 5 mm behind the spot where the blocked beam impinges on the glass, the median crack depth is approximately 100 microns. By adjusting the nozzle to generate a cooling distance of 12 mm, the median crack depth is increased to approximately 110 microns.

Final separation of the glass sheet 10 into smaller sheets is then achieved by applying a bending moment under crack 20. Such bending can be accomplished using conventional bending apparatus (not shown) and techniques such as are used to separate glass sheets in processes employing the more conventional mechanical surface scoring methods.

The laser beam 30 used for the glass separation operation should be able to heat the surface of the glass to be cut. Consequently, the laser radiation preferably is at a wavelength that can be absorbed by the glass. For this to occur, the radiation should preferably be in the infra-red range, with a wavelength in excess of 2 micrometers, such as the beam of a $CO_2$ laser, with its wavelength of 9–11 micrometers; or a CO laser with its wavelength of 5–6 micrometers, or an HF laser with its wavelength of 2.6–3.0 micrometers, or an erbium YAG laser with its wavelength of about 2.9 micrometers. While the majority of current experiments have employed the use of $CO_2$ lasers having powers in the 150–300 Watt range, it is believed that even higher power lasers could be successfully used.

Although the invention has been described in detail for the purpose of illustration, it should be understood that such detail is solely for that purpose, and that variations can be made therein by those skilled in the art without departing from the spirit and scope of the invention, which is defined by the following claims. Accordingly, it should be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method of scoring glass by passing a laser beam over its surface comprising the steps of:
    operating a laser to form a first beam;
    transforming the first beam with one or more lenses to form a second beam having an elongated elliptical beam spot with a major axis and a minor axis where it impinges on the glass, said scoring being in the direction of said major axis;
    physically blocking a portion of the second beam corresponding to at least one end of the second beam, to reduce the major axis of the second beam spot and form a third beam;
    moving the third beam across the surface of the glass to form heated glass, where the moving third beam has a leading edge and a trailing edge; and
    streaming coolant from a nozzle onto the heated glass at a predetermined distance from the trailing edge of the moving third beam, to form a crack in the glass.

2. The method of claim 1, comprising the step of changing the predetermined distance to effect control of the depth of the crack.

3. The method of claim 1, wherein said laser comprises a $CO_2$ laser.

4. The method of claim 1, wherein said laser is operated in "D" mode.

5. The method of claim 1, wherein said third beam is moved at a speed of from about 200 to about 700 millimeters per second relative to the glass.

6. The method of claim 1, wherein two cylindrical lenses are used to transform the first beam into the second beam.

7. The method of claim 1, wherein the second beam is physically blocked at a region corresponding to one end portion of the second beam spot.

8. The method of claim 1, wherein the second beam is physically blocked at regions corresponding to both end portions of said second beam spot.

9. The method of claim 1, wherein the major axis of the second beam is reduced about twenty to forty percent after blocking said portion of said second beam.

10. The method of claim 1, wherein the major axis of the second beam spot is reduced from between about 100 millimeters to 120 millimeters before blocking to a major axis from between about 50 millimeters to 80 millimeters after blocking said portion of said second beam.

11. A method for separating flat glass sheets comprising:
    a) moving a laser beam across a glass sheet in a desired line of separation, said laser beam having a truncated elliptical beam spot where it impinges on said glass sheet, said beam spot having a major axis and minor axis dimension with the major axis dimension being aligned with said line of separation and the truncation being a truncation of the major axis dimension;
    b) streaming coolant across a glass sheet along the desired line of separation and at a predetermined distance behind said laser beam to propagate a partial depth crack; and
    c) separating said sheet along said crack.

12. The method of claim 11, wherein said truncated elliptical beam spot is formed by blocking a portion of said laser beam corresponding to an end of an elliptical beam spot to reduce the major axis of said beam spot.

13. The method of claim 12, wherein portions of said laser beam corresponding to each end of said elliptical beam spot are blocked.

14. The method of claim 11, further comprising the step of changing the predetermined distance to effect control of the depth of the crack.

15. The method of claim 11, wherein said laser beam is generated by a $CO_2$ laser.

16. The method of claim 11, wherein said laser beam is generated by a laser operated in "D" mode.

17. The method of claim 11, wherein said laser beam is moved at a speed of from about 200 to about 700 millimeters per second relative to the glass sheet.

18. The method of claim 11, wherein the major axis of the beam is reduced about twenty to forty percent after blocking said portion of said beam.

* * * * *